M. C. BURNS.
SELF LOADING TRUCK AND EXCAVATOR.
APPLICATION FILED AUG. 22, 1913.

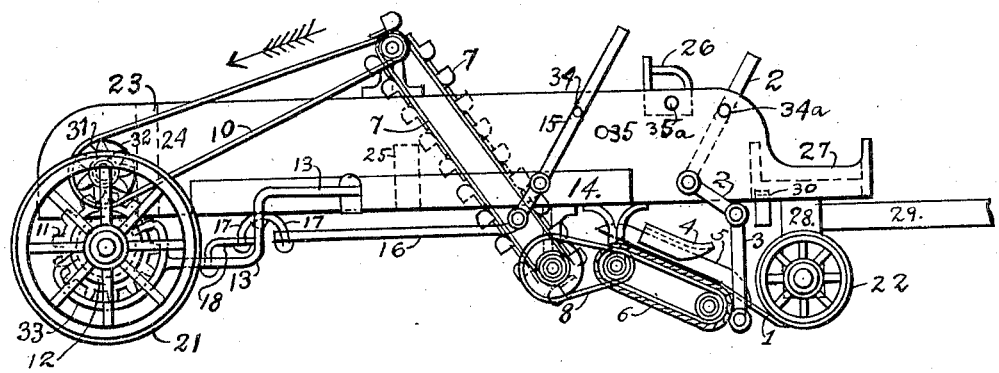

1,179,894.

Patented Apr. 18, 1916.
2 SHEETS—SHEET 2.

THE COLUMBIA PLANOGRAPH CO., WASHINGTON, D. C.

UNITED STATES PATENT OFFICE.

MARTIN C. BURNS, OF NEW YORK, N. Y.

SELF-LOADING TRUCK AND EXCAVATOR.

1,179,894.     Specification of Letters Patent.     Patented Apr. 18, 1916.

Application filed August 22, 1913. Serial No. 786,150.

*To all whom it may concern:*

Be it known that I, MARTIN C. BURNS, a citizen of the United States, residing at No. 344 Van Sicklen avenue, in the borough of Brooklyn, city of New York, in the county of Kings and State of New York, have invented a new and useful Self-Loading Truck and Excavator, of which the following is a specification.

My invention relates to improvements in self-loading trucks and excavators, moved by animal power, such as teams of horses or mules, and it consists in the novel features hereinafter more fully described.

The objects of my improvement are:— First, to provide an excavator and truck, wherein the excavated material is automatically loaded into the truck, thereby saving the labor of shoveling. Second, to insure the control of the driver over all the parts of the mechanism, and to render the manipulation of the machine a simple and easy matter. Third, to have the construction of the apparatus simple, durable and inexpensive. I attain these objects by the mechanism illustrated in the accompanying drawings, in which—

Figure 3:
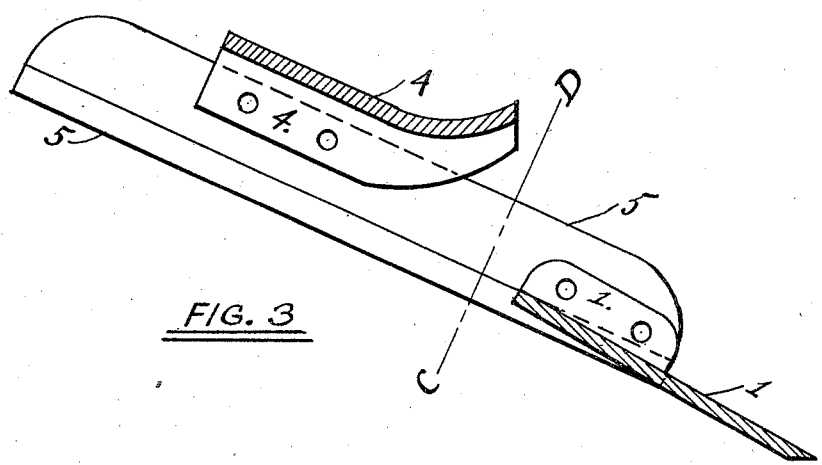
Figure 4:
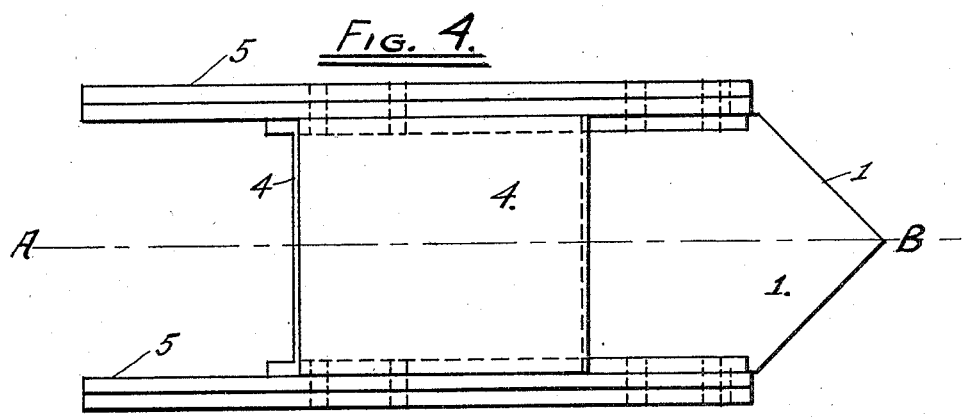
Figure 5:
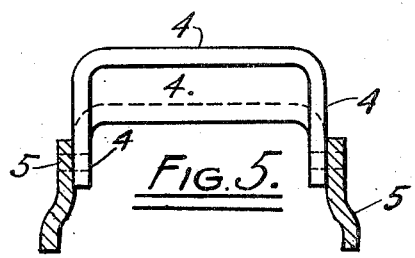

Figure 1 is an elevation of the entire apparatus; Fig. 2 is a top view of my self-loading truck and excavator. Figs. 3, 4 and 5 are enlarged views of the details 1, 4 and 5 shown in Figs. 1 and 2; Fig. 3 is a section on the line A—B of Fig. 4; Fig. 5 is a section on line C—D of Fig. 3.

Similar numerals refer to similar parts throughout the several views of the drawings.

1 is the scoop or excavator, 2 are the bell-crank levers for lifting and dropping the scoop 1 by means of the link 3; 4 is a guard for regulating the depth of the layer of material passing from said scoop to said conveyer; 5, 5, are the side-guards of the conveyer 6, which carries off the excavated material from the scoop 1.

7, 7, is a bucket elevator, which picks up the excavated material, after it leaves the conveyer 6, and loads it into the truck at the rear part thereof; 8 is the band or chain, which transmits the motion from the lower shaft of the bucket elevator 7 to the upper shaft of the conveyer 6.

9, 9, are the two halves of the dumping bottom of the truck, which may be of any standard or special design, and of which the operating mechanism is not shown here; 10 is the band or chain, which transmits the motion from the pulley 32 to the upper shaft of the bucket elevator.

11 is a gear wheel, which is engaged by one of the rear wheels 21 of the truck by means of the jaw clutch 12.

13 is a lever pivoted at one end to a block 20, and terminating in a shifter 33 for the clutch 12.

14 is a side beam, to which the levers and bars are connected for manipulating the clutch-shifter by means of the hand lever 15; 16 is a horizontal link connected at one end to the hand lever 15 and at the other end to the bell crank lever 17, 17; 18 is a link connecting the bell crank lever 17, 17, to the clutch lever 13; 19 is a spline in the hubs of the inner half of the clutch 12 and gear-wheel 11, which permits the clutch 12 to slide on it lengthwise.

20 is a pivot block for the clutch lever 13; 21, 21, are the rear wheels of the truck; 22, 22 are the front wheels; 23, 23 are the sides; 24 is the rear wall, and 25 is the front wall of the truck; 26 is the driver's seat; 27 is the dashboard; 28 is the turntable; 29 is the truck shaft; 30, 30 are stops for the turntable 28, to prevent its interfering with the conveyer 6 or with other parts of the mechanism.

31 is a pinion for reversing the direction of motion from the wheel 21 to that of the band 10, as shown by the arrow.

32 is a pulley, which is fixed on the same shaft as the pinion 31, which shaft is omitted in the plan; 33 is the clutch shifter.

34 and 34ª are position pins in the levers 2 and 15; 35 and 35ª are apertures in the side of the truck at the extreme positions of each of the levers 2 and 15.

Sundry standard machine parts such as pins, pulleys, bearings, shafts, etc., are not designated by any particular numeral in the drawings; also some of the standard machine parts are omitted from either or both of the views of the drawings, for the sake of clearness.

The operation of my self loading truck and excavator is as follows: By means of the band or chain 8 motion will be transmitted to the conveyer 6, which is made up of slats, which are slightly curved across their width. Moving the bell crank levers 2, 2, forward into the position shown in the drawings and allowing them to be locked in position by the pin 34ª and aperture similar to that shown at 35ª, the links 3, 3, will drop the forward end of the scoop 1, which is supported on the underside by a cross bar pivotally connected at each end to the lower extremities of the links 3, 3, which are employed in duplicate, the same as the bell crank levers 2, 2. The depth of the cut of the scoop 1 can be regulated by the position of the levers 2, 2, and also indirectly by the guard 4, which extends across the full width of the conveyer 6, and the sides of said guard 4 are connected to the side guards 5, 5, of the conveyer 6.

The guard 4 is shown as curved at its upper forward end in order to gradually restrict the area of the passage for the excavated material from the scoop 1 to the conveyer 6, thereby preventing the said material from passing over the guard and also from choking the passage to the conveyer.

The quantity of excavated material accumulating in front of the guard 4 will be visible to the driver of the truck, who will thereby be in a position to judge of the advisability of either raising or lowering the scoop 1.

The upper and rearward shaft of the conveyer is shown as supported by bearings connected to the underside of the truck; the bearings of the lower or forward shaft may be connected to the side guards of the conveyer or to the cross-bar carried by the lifting links 3, 3.

The excavated material passes the throat of the guard 4, is carried backward and slightly upward by the conveyer 6, and it is dropped into the bucket-elevator, which discharges it over the front wall 25 into the dumping truck 23—24—25.

It will be noted that the angular velocity is continually increased in transmitting the motion from the gear wheel 11 to the pinion 32, from the latter to the upper shaft of the bucket elevator, and from the lower shaft of the same to the rear shaft of the conveyer 6. By this arrangement the linear velocity of the conveyer 6 will be higher than that of the bucket elevator 7, and the linear velocity of the latter may be either equal to or higher than that of the truck.

Many modifications could be made in the design of my self loading truck and excavator without departing from the main scope of my invention.

What I claim as my invention and desire to secure by Letters Patent, is:

1. In a self-loading truck and excavator the combination of an excavating blade or scoop, a conveyer at the rear of said scoop, operatively connected to said truck, and adapted to remove the excavated material in a direction contrary to the motion of said scoop, a guard secured above said conveyer, said guard forming with the surface of said conveyer a passage for said excavated material.

2. In a self-loading truck and excavator the combination of an excavating blade or scoop, a conveyer operatively connected to said truck and adapted to remove the excavated material in a direction contrary to the motion of said scoop, a guard secured above said conveyer, said guard forming with the surface of said conveyer a flaring passage for said material, the area of said passage being gradually restricted rearwardly.

MARTIN C. BURNS.

Witnesses:
WILLIAM A. SCHACHE,
BERTHA BLUM.

Copies of this patent may be obtained for five cents each, by addressing the "Commissioner of Patents, Washington, D. C."